United States Patent
Perlow et al.

(10) Patent No.: US 11,757,524 B2
(45) Date of Patent: *Sep. 12, 2023

(54) UPLINK BEAMFORMING BETWEEN AN AIRBORNE TRANSCEIVER AND A TERRESTRIAL TRANSCEIVER

(71) Applicant: T-Mobile Innovations LLC, Overland Park, KS (US)

(72) Inventors: Harry W. Perlow, Palm Harbor, FL (US); Walter F. Rausch, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/538,176

(22) Filed: Nov. 30, 2021

(65) Prior Publication Data
US 2022/0094426 A1 Mar. 24, 2022

Related U.S. Application Data

(63) Continuation of application No. 16/843,657, filed on Apr. 8, 2020, now Pat. No. 11,239,903.

(51) Int. Cl.
*H04B 7/185* (2006.01)
*H04B 7/06* (2006.01)

(52) U.S. Cl.
CPC ....... *H04B 7/18506* (2013.01); *H04B 7/0617* (2013.01)

(58) Field of Classification Search
CPC .............. H04B 7/18506; H04B 7/0617; H04B 7/18582; H04B 7/18508; H04B 7/18584; H04B 7/2041; H04H 40/90
See application file for complete search history.

(56) References Cited

U.S. PATENT DOCUMENTS

| 6,246,361 B1 | 6/2001 | Weill et al. |
| 7,328,012 B2 | 2/2008 | Ziarno et al. |

(Continued)

FOREIGN PATENT DOCUMENTS

| WO | 2015001425 A2 | 1/2015 |
| WO | 2016115061 A1 | 7/2016 |

OTHER PUBLICATIONS

Department of Transportation; "Remote Identification of Unmanned Aircraft Systems"; Billing Code 4910-13-P; Dec. 20, 2019; pp. 1-319; Notice No. 20-01; Federal Aviation Administration; Washington, D.C.

(Continued)

*Primary Examiner* — Phuongchau Ba Nguyen

(57) ABSTRACT

A terrestrial transceiver beamforms an uplink signal from an airborne transceiver. In the terrestrial transceiver, a radio wirelessly receives an airborne transceiver Identifier (ID) and reference signals from the airborne transceiver. A Baseband Unit (BBU) determines a beamforming instruction based on the airborne transceiver ID and the reference signals. The radio wirelessly transfers the beamforming instruction to the airborne transceiver. The airborne transceiver beamforms the uplink signal based on the beamforming instruction. The radio wirelessly receives the beamformed uplink signal from the airborne transceiver. The BBU receives the beamformed uplink signal from the radio.

20 Claims, 12 Drawing Sheets

(56) References Cited

U.S. PATENT DOCUMENTS

| | | | |
|---|---|---|---|
| 7,640,016 | B2 | 12/2009 | Cruz et al. |
| 8,130,693 | B2 | 3/2012 | Miller et al. |
| 8,848,605 | B2 | 9/2014 | Ohm et al. |
| 8,918,099 | B2 | 12/2014 | Mitchell |
| 8,923,189 | B2 | 12/2014 | Leabman |
| 9,730,077 | B2 | 8/2017 | Stone et al. |
| 9,826,448 | B2 | 11/2017 | Le et al. |
| 9,998,202 | B2 | 6/2018 | Hyslop |
| 10,165,452 | B2 | 12/2018 | Ramamurthi et al. |
| 10,306,527 | B2 | 5/2019 | Hyslop |
| 11,337,159 | B2 * | 5/2022 | Gao ............... H04W 52/08 |
| 11,451,333 | B2 * | 9/2022 | Andersson ........... H04L 1/0004 |
| 2006/0155840 | A1 | 7/2006 | Giffin et al. |
| 2015/0094056 | A1 | 4/2015 | Oh |
| 2016/0183248 | A1 * | 6/2016 | Niu ............... H04B 7/0413 370/329 |
| 2016/0254854 | A1 | 9/2016 | Wharton et al. |
| 2017/0019800 | A1 | 1/2017 | Liu et al. |
| 2017/0302368 | A1 | 10/2017 | Trott |
| 2019/0229789 | A1 | 7/2019 | Zhang et al. |
| 2019/0260462 | A1 | 8/2019 | Axmon et al. |
| 2019/0268064 | A1 | 8/2019 | Chandra et al. |
| 2019/0393954 | A1 | 12/2019 | Perdew et al. |
| 2020/0076484 | A1 | 3/2020 | Noh et al. |
| 2020/0367234 | A1 * | 11/2020 | Bergström ........ H04W 72/0446 |
| 2020/0389229 | A1 * | 12/2020 | Dankberg .......... H04B 7/18517 |
| 2022/0116087 | A1 * | 4/2022 | Österling ............. H04B 7/0617 |

OTHER PUBLICATIONS

Federal Aviation Administration; "Notice of Proposed Rulemaking on Remote Identification of Unmanned Aircraft Systems (Part 89)"; Executive Summary; Dec. 20, 2019; pp. 1-3; Federal Aviation Administration; Washington, D.C.

Jackie McCarthy, et al.; "Comments of the CTIA"; Dec. 26, 2019; pp. 1-20; Federal Communications Commission; Washington, D.C.

\* cited by examiner

UPLINK BEAMFORMING BETWEEN AN AIRBORNE TRANSCEIVER AND A TERRESTRIAL TRANSCEIVER

RELATED CASES

This United States Patent Application is a continuation of U.S. patent application Ser. No. 16/843,657 that was filed on Apr. 8, 2020 and is entitled "UPLINK BEAMFORMING BETWEEN AN AIRBORNE TRANSCEIVER AND A TERRESTRIAL TRANSCEIVER." U.S. patent application Ser. No. 16/843,657 is hereby incorporated by reference into this United States Patent Application.

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless access nodes that exchange wireless signals with the wireless user devices over radio frequencies using wireless network protocols. Exemplary wireless network protocols include Long Term Evolution (LTE) and Fifth Generation New Radio (5GNR).

The wireless user devices are being mounted on airborne devices like drones and airplanes. These aerial wireless devices distribute their interference differently than ground wireless devices. The ground wireless devices propagate signals up toward an elevated access node and the signal interference is localized at the serving access node and the neighbor access nodes. In contrast, the aerial wireless user devices propagate signals from high altitudes down to a serving access node, but the signal interference geographically spreads from the high altitudes to access nodes well beyond the serving access node and the neighbor access nodes. The signal interference from the aerial wireless devices is not localized like the signal interference from the ground wireless devices.

To overcome the increased interference from the aerial wireless devices, the wireless access nodes increase the transmit power of the ground wireless user devices which creates more interference. In some scenarios, several aerial wireless user devices can spread enough interference across a large metropolitan area to force runaway increases in transmit power and interference. The interference from the aerial wireless devices can bring down or seriously degrade a wireless communication network.

To mitigate some interference, the wireless access nodes use downlink beamforming to focus their beams on the individual wireless user devices. The downlink beamforming uses physical wave guides like cans, horns, and reflectors to generate the downlink beams. In some implementations, downlink beamforming uses phase shifting to generate downlink beams from multiple radiators. The downlink beamforming uses null signals that cancel unwanted signal energy that emanates from the desired beam pattern. The receiving wireless user devices provide beamforming feedback to the transmitting wireless access nodes to assist in subsequent downlink beamforming. Exemplary beamforming feedback comprises Received Signal Strength Indicator (RSSI), Rank Index (RI), and Precoding Matrix Indicator (PMI).

Unfortunately, the wireless communication networks do not effectively and efficiently beamform uplinks from the aerial wireless communication devices to the terrestrial wireless access nodes to mitigate the excessive interference.

Technical Overview

A terrestrial transceiver beamforms an uplink signal from an airborne transceiver. In the terrestrial transceiver, a radio wirelessly receives an airborne transceiver Identifier (ID) and reference signals from the airborne transceiver. A Baseband Unit (BBU) determines a beamforming instruction based on the airborne transceiver ID and the reference signals. The radio wirelessly transfers the beamforming instruction to the airborne transceiver. The airborne transceiver beamforms the uplink signal based on the beamforming instruction. The radio wirelessly receives the beamformed uplink signal from the airborne transceiver. The BBU receives the beamformed uplink signal from the radio.

DETAILED DESCRIPTION

Figure 1:
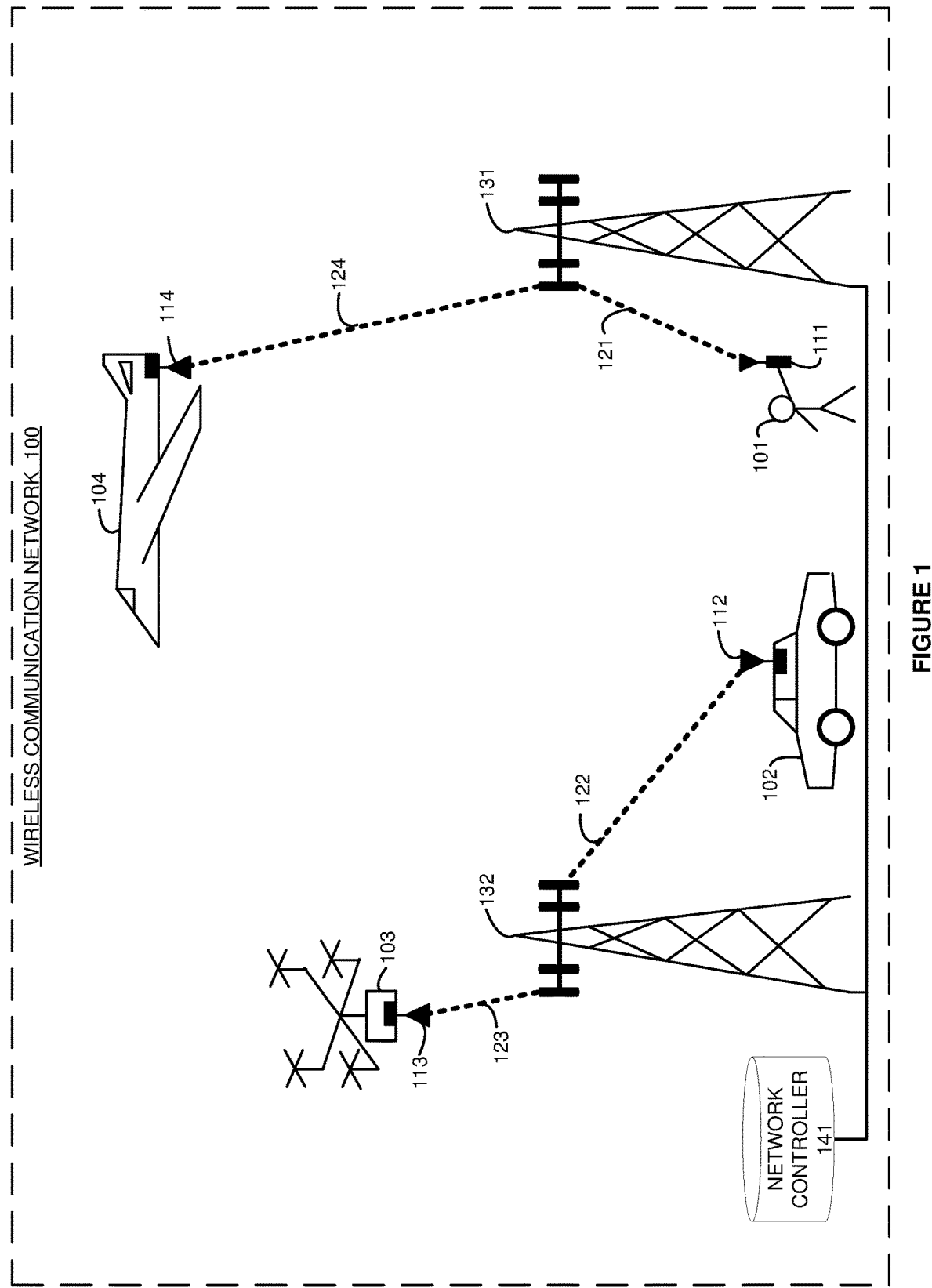
FIG. 1 illustrates a wireless communication network that beamforms an uplink based on an antenna type and an aperture beamwidth of an airborne transceiver.

FIG. 1 illustrates wireless communication network 100 that beamforms uplinks based on the antenna type and the aperture beamwidth of airborne transceivers 113-114. Wireless communication network 100 supports wireless data services like Internet-access, media-streaming, messaging, machine-control, machine-communications, and/or some other wireless data product. Wireless communication network 100 comprises ground transceivers 111-112, airborne transceivers 113-114, terrestrial transceivers 131-132, and network controller 141. Ground transceiver 111 is operated by human 101. Ground transceiver 112 is integrated within vehicle 102. Airborne transceiver 113 is integrated with aerial drone 103. Airborne transceiver 114 is integrated with airplane 104. Other types of ground and airborne platforms could be used for transceivers 111-114.

Figure 2:
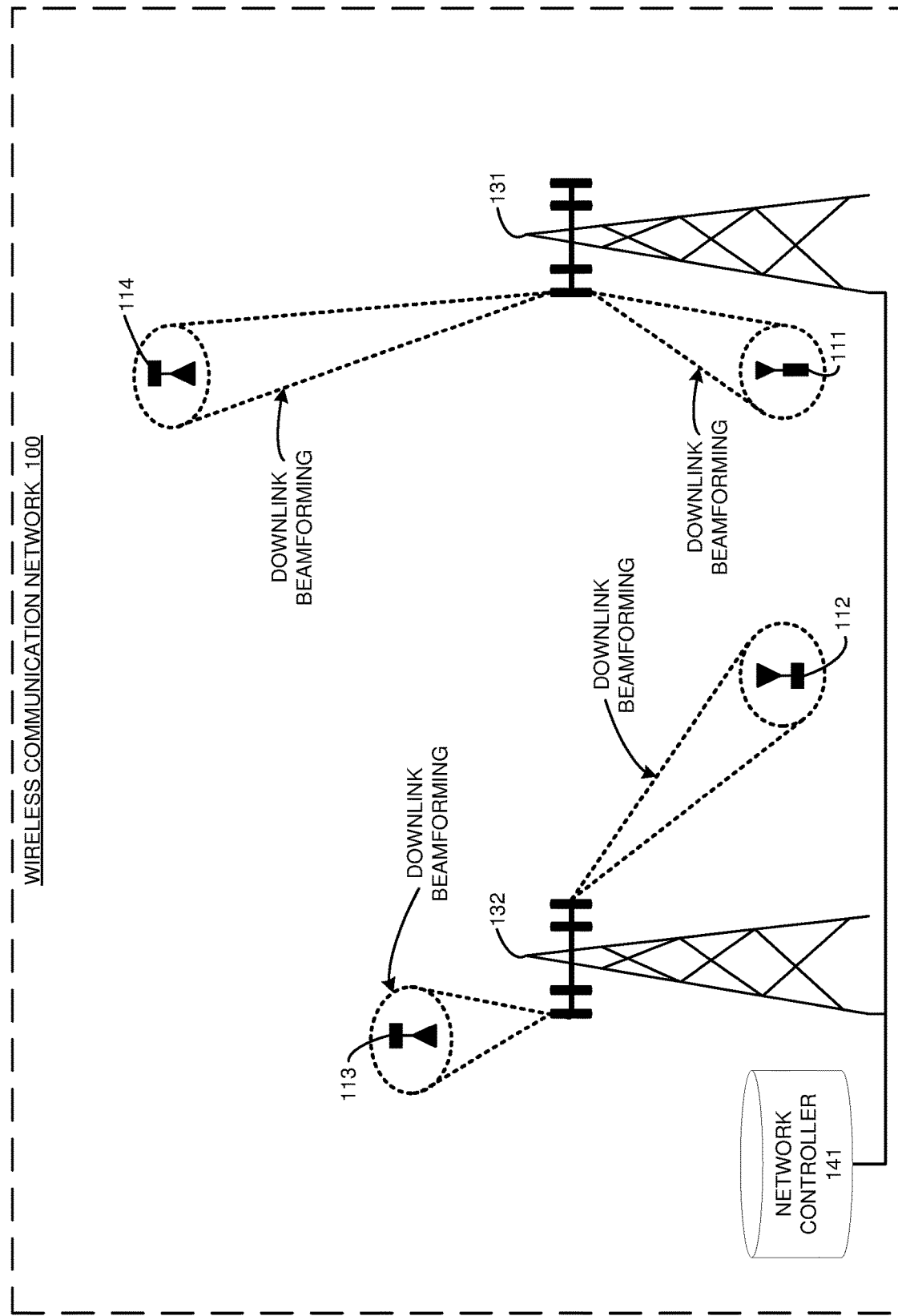
FIG. 2 illustrates the wireless communication network that beamforms the downlink based on the base station antenna type and uplink feedback.

FIG. 2 illustrates downlink beamforming from terrestrial transceivers 131-132 to ground/airborne transceivers 111-114 in wireless communication network 100. The downlink beams propagate in a general cone pattern where wave guides and/or null signals are used to restrict the beam energy to the desired pattern. In some examples, downlink beamforming is not used for airborne transceivers 113-114 and possibly not for ground transceivers 111-112 either.

Figure 3:
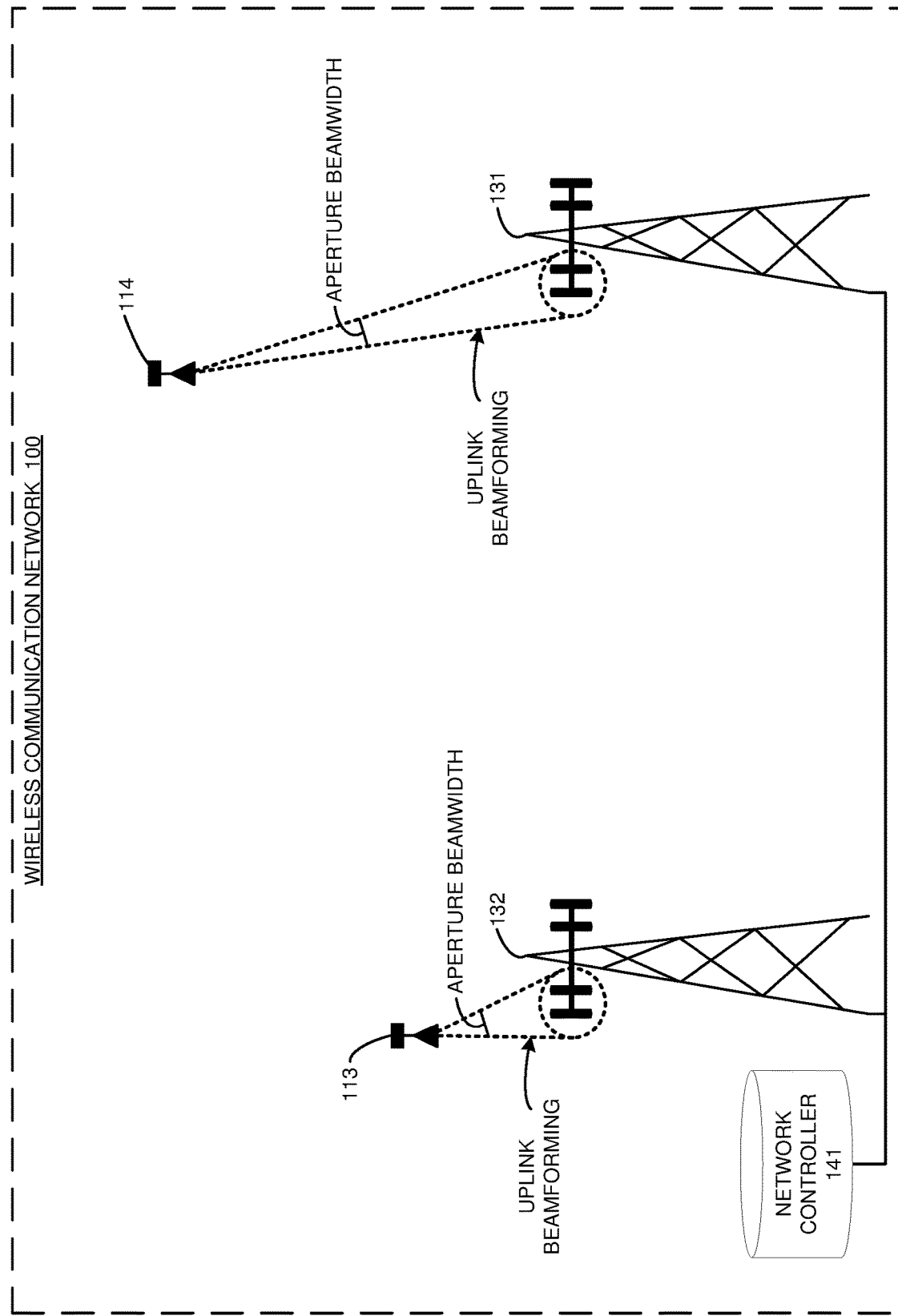
FIG. 3 illustrates the wireless communication network that beamforms the uplink based on the antenna type and the aperture beamwidth of the airborne transceiver.

FIG. 3 illustrates aerial uplink beamforming from airborne transceivers 111-114 to terrestrial transceivers 131-132. The uplink beams propagate in a general cone pattern where wave guides and/or null signals are used to restrict the beam energy to the desired pattern. The aerial uplink beamforming is based on the antenna types and the aperture beamwidths of airborne transceivers 113-114. The angle formed by the tip of the cone of the uplink beam comprises the aperture beamwidth. A high aperture beamwidth like 30 degrees propagates a wider beam than a low aperture beamwidth like 5 degrees. An aperture beamwidth of 360 degrees results in an omni-directional signal (not a beam), and an aperture beamwidth of 1 degree creates a very narrow beam.

Referring to back FIG. 1, ground transceiver 111 and terrestrial transceiver 131 are coupled over wireless link 121. Ground transceiver 112 and terrestrial transceiver 132 are coupled over wireless link 122. Airborne transceiver 113 and terrestrial transceiver 132 are coupled over wireless link 123. Airborne transceiver 114 and terrestrial transceiver 131 are coupled over wireless link 124. Wireless links 121-124 use frequencies in the low-band, mid-band, high-band, or some other part or the wireless electromagnetic spectrum. Wireless links 121-124 use protocols like Fifth Generation New Radio, (5GNR), Long Term Evolution (LTE), Low-Power Wide Area Network (LP-WAN), Institute of Electrical and Electronic Engineers (IEEE) 802.11 (WIFI), or some other wireless networking technology.

Terrestrial transceivers 131-132 are coupled to one another and to network controller 141 over backhaul links. The backhaul links may use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, and/or some other data networking protocol.

Ground and airborne transceivers 111-114 comprise radios and control circuitry which are coupled over bus circuitry. Terrestrial transceivers 131-132 comprise radios and Baseband Units (BBUs) which are coupled over bus circuitry. The radios comprise antennas, filters, amplifiers, analog-to-digital interfaces, microprocessors, memory, software, transceivers, bus circuitry, and the like. The control circuitry, BBUs, and network controller 141 comprise microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, user applications, and network applications.

Transceivers 111-114 had transceiver Identifiers (IDs) like Subscriber Profile Identifiers (SPIDs), Subscriber Identity Module (SIM) codes, hardware-trust codes, or some other user equipment IDs. In this example, the airborne transceiver ID for airborne transceiver 113 is pre-associated with its antenna type and aperture beamwidth in network controller 141. Likewise, the airborne transceiver ID for airborne transceiver 114 is pre-associated with its antenna type and aperture beamwidth in network controller 141. For example, network controller 141 may store a SPID for aerial transceiver 114 in association with codes that identify software modules, networking parameters, and/or some other beamforming information that is specific to the antenna type and the aperture beamwidth of airborne transceiver 114. In some examples, terrestrial transceivers 131-132 and/or airborne transceivers 113-114 may maintain and use these associations directly to initiate aerial uplink beamforming.

Ground transceiver 111 wirelessly transfers its transceiver ID to terrestrial transceiver 131 over link 121. Terrestrial transceiver 131 transfers the transceiver ID for ground transceiver 111 to network controller 141. Network controller 141 enters a data structure with the transceiver ID for ground transceiver 111 to determine if ground transceiver 111 qualifies for aerial uplink beamforming. Since ground transceiver 111 is not an airborne transceiver, ground transceiver 111 does not qualify for aerial uplink beamforming. Ground transceiver 111 and terrestrial transceiver 131 exchange wireless communications over wireless link 121 without using aerial uplink beamforming.

Ground transceiver 112 wirelessly transfers its transceiver ID to terrestrial transceiver 132 over link 122. Terrestrial transceiver 132 transfers the transceiver ID for ground transceiver 112 to network controller 141. Network controller 141 enters the data structure with the transceiver ID for ground transceiver 112 to determine if ground transceiver 112 qualifies for aerial uplink beamforming. Since ground transceiver 112 is not an airborne transceiver, ground transceiver 112 does not qualify for aerial uplink beamforming. Ground transceiver 112 and terrestrial transceiver 132 exchange wireless communications over wireless link 122 without using aerial uplink beamforming.

Airborne transceiver 113 wirelessly transfers its transceiver ID to terrestrial transceiver 132 over link 123. Terrestrial transceiver 132 transfers the transceiver ID for airborne transceiver 113 to network controller 141. Network controller 141 enters the data structure with the transceiver ID for airborne transceiver 113 to determine if airborne transceiver 113 qualifies for aerial uplink beamforming, and in this example, airborne transceiver 113 qualifies for aerial uplink beamforming. Network controller 141 signals terrestrial transceiver 132 to initiate aerial uplink beamforming for airborne transceiver 113 and indicates data specific to the antenna type and aperture beamwidth of airborne transceiver 113.

Airborne transceiver 113 comprises one or more antennas that have an antenna type. The antenna type has an aperture beamwidth which indicates the spread of main lobe energy from the antenna elements. Terrestrial transceiver 132 receives the signaling from network controller 141 and responsively initiates aerial uplink beamforming for the specific antenna type and the aperture beamwidth of airborne transceiver 113. For example, terrestrial transceiver 132 may use specific networking software modules that are configured for the antenna type and aperture beamwidth of airborne transceiver 113. Terrestrial transceiver 132 wirelessly receives uplink wireless signals from airborne transceiver 113 over link 123. To beamform the uplink, terrestrial transceiver 132 determines uplink beamforming metrics for the uplink wireless signal and determines the altitude of airborne transceiver 113. For example, terrestrial transceiver 132 may process sounding reference signals from airborne transceiver 113 to determine received signal amplitude and phase from each transmitting antenna element to each receiving antenna element. Terrestrial transceiver 132 may determine the altitude of airborne transceiver based on signal loss, radio triangulation, airborne transceiver signaling, or some other technique.

Terrestrial transceiver 132 processes the beamforming metrics and the altitude to generate an uplink beamforming instruction and an uplink power instruction for the specific antenna type and aperture beamwidth of airborne transceiver 113. In some examples, terrestrial transceiver 132 determines an uplink Received Signal Strength Indicator (RSSI), uplink Precoding Matrix Indicator (PMI), an uplink Rank Index (RI) based on the beamforming metrics and the altitude. Terrestrial transceiver 132 may select an uplink beamforming instruction to increase the length of an antenna can. Terrestrial transceiver 132 may select an uplink power instruction to decrease uplink transmit power for airborne transceiver 113 when ground reflection gain will contribute significant signal energy at terrestrial transceiver 132. Terrestrial transceiver 132 wirelessly transfers the uplink beamforming instruction and the uplink power instruction to airborne transceiver 113. The uplink beamforming instructions may include the uplink RSSI, PMI, and RI.

Airborne transceiver 113 wirelessly receives the uplink beamforming instruction and the uplink power instruction. In response, airborne transceiver 113 beamforms an uplink wireless signal responsive to the uplink beamforming instruction. In some examples, airborne transceiver 113 beamforms the uplink wireless signal based on the uplink RSSI, PMI, and RI. Airborne transceiver 113 amplifies the uplink wireless signal responsive to the uplink power instruction. Airborne transceiver 113 wirelessly transmits the uplink wireless signal to terrestrial transceiver 132. In some examples, airborne transceiver 113 determines its geometric orientation relative to terrestrial transceiver 132 and alters the beamforming instructions based on the geometric orientation. For example, when aerial drone 103 turns, airborne transceiver 113 may sense the turn with gyro circuitry and alter the uplink beamforming to center the beam on terrestrial transceiver 132 throughout the turn.

Airborne transceiver 114 wirelessly transfers its transceiver ID to terrestrial transceiver 131 over link 124. Terrestrial transceiver 131 transfers the transceiver ID for airborne transceiver 114 to network controller 141. Network controller 141 enters the data structure with the transceiver ID for airborne transceiver 114 to determine if airborne transceiver 114 qualifies for aerial uplink beamforming, and in this example, airborne transceiver 114 qualifies for aerial uplink beamforming. Network controller 141 signals terrestrial transceiver 131 to initiate aerial uplink beamforming for airborne transceiver 114 and indicates data specific to the antenna type and aperture beamwidth of airborne transceiver 114.

Airborne transceiver 114 comprises one or more antennas that have an antenna type. The antenna type has an aperture beamwidth which indicates the spread of main lobe energy from the antenna elements. Terrestrial transceiver 131 receives the signaling from network controller 141 and responsively initiates aerial uplink beamforming for the antenna type and the aperture beamwidth of airborne transceiver 114. For example, terrestrial transceiver 131 may use specific networking software modules that are configured for the antenna type and aperture beamwidth of airborne transceiver 114. Terrestrial transceiver 131 wirelessly receives uplink wireless signals from airborne transceiver 114 over link 124. To beamform the uplink, terrestrial transceiver 131 determines uplink beamforming metrics for the uplink wireless signal and determines the altitude of airborne transceiver 114. For example, terrestrial transceiver 131 may process sounding reference signals from airborne transceiver 114 to determine received signal amplitude and phase from each transmitting antenna element to each receiving antenna element.

Terrestrial transceiver 131 processes the beamforming metrics and the altitude to generate an uplink beamforming instruction and an uplink power instruction for the antenna type and the aperture beamwidth of airborne transceiver 114. In some examples, terrestrial transceiver 132 determines an uplink RSSI, PMI, RI based on the beamforming metrics and the altitude. For example, terrestrial transceiver 131 may select an uplink beamforming instruction to increase the null signal on a noisy side of the main lobe. Terrestrial transceiver 131 may select an uplink power instruction to increase the uplink transmit power for airborne transceiver 114 when its altitude indicates that ground reflection will no longer contribute significant signal energy at terrestrial transceiver 131. Terrestrial transceiver 131 wirelessly transfers the uplink beamforming instruction and the uplink power instruction to airborne transceiver 114. The uplink beamforming instructions may include the uplink RSSI, PMI, and RI.

Airborne transceiver 114 wirelessly receives the uplink beamforming instruction and the uplink power instruction. In response, airborne transceiver 114 beamforms an uplink wireless signal responsive to the uplink beamforming instruction. In some examples, airborne transceiver 113 beamforms the uplink wireless signal based on the uplink RSSI, PMI, and RI. Airborne transceiver 114 amplifies the uplink wireless signal responsive to the uplink power instruction. Airborne transceiver 114 wirelessly transmits the uplink wireless signal to terrestrial transceiver 131. In some examples, airborne transceiver 114 determines its geometric orientation relative to terrestrial transceiver 131 and alters the beamforming based on the geometric orientation. When airplane 114 turns, airborne transceiver 114 may sense the turn with gyro circuitry and alter the beamforming to center the uplink beam on terrestrial transceiver 131 throughout the turn.

In some examples, terrestrial transceiver 132 initiates aerial downlink beamforming for airborne transceiver 113 based on its airborne transceiver ID as shown on FIG. 2. For example, network controller 141 may initiate aerial downlink beamforming along with the aerial uplink beamforming. Airborne transceiver 113 wirelessly receives a downlink wireless signal from terrestrial transceiver 132. In response to the aerial downlink beamforming, airborne transceiver 113 determines downlink beamforming metrics for the downlink wireless signal like RSSI and RI. Airborne transceiver 113 processes the downlink beamforming metrics and responsively generates a downlink beamforming instruction for terrestrial transceiver 132 like PMI. Airborne transceiver 113 wirelessly transfers the downlink beamforming instruction to terrestrial transceiver 132. Terrestrial transceiver 132 wirelessly receives the downlink beamforming instruction and responsively beamforms and wirelessly transmits a downlink wireless signal in response to the downlink beamforming instruction. Airborne transceiver 113 wirelessly receives the downlink wireless signal from terrestrial transceiver 132.

In some examples, terrestrial transceiver 131 initiates aerial downlink beamforming for airborne transceiver 114 over link 124 based on its airborne transceiver ID as shown on FIG. 2. Airborne transceiver 114 wirelessly receives a downlink wireless signal from terrestrial transceiver 131. In response to the aerial downlink beamforming, airborne transceiver 114 determines downlink beamforming metrics for the downlink wireless signal like RSSI and RI. Airborne transceiver 114 processes the downlink beamforming metrics and responsively generates a downlink beamforming instruction for terrestrial transceiver 131 like PMI. Airborne transceiver 114 wirelessly transfers the downlink beamforming instruction to terrestrial transceiver 131. Terrestrial transceiver 131 wirelessly receives the downlink beamforming instruction and responsively beamforms and wirelessly transmits a downlink wireless signal in response to the downlink beamforming instruction. Airborne transceiver 114 wirelessly receives the downlink wireless signal from terrestrial transceiver 131.

Figure 4:
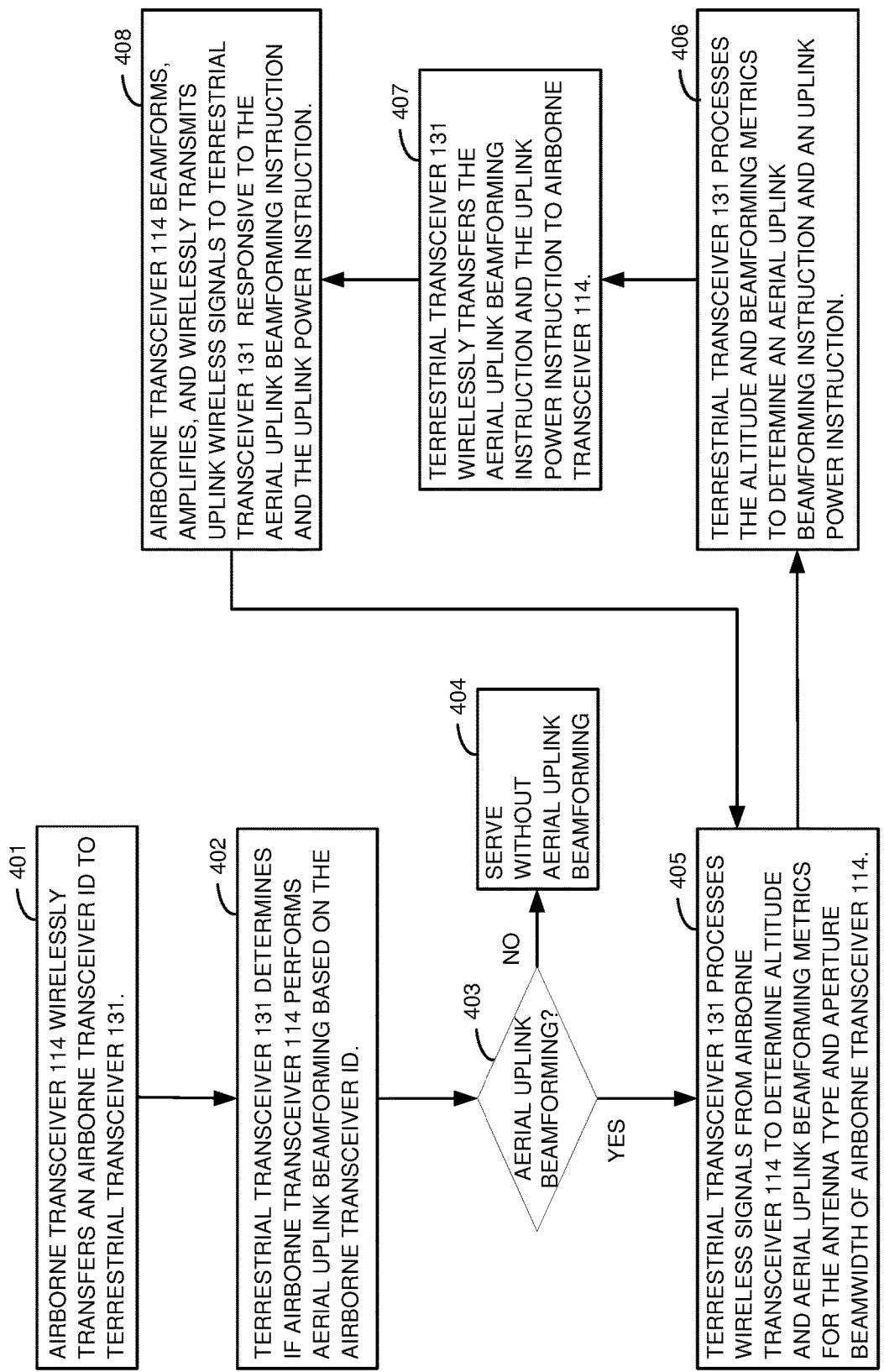
FIG. 4 illustrates the operation of the wireless communication network to beamform the uplink based on the antenna type and the aperture beamwidth of the airborne transceiver.

FIG. 4 illustrates the operation of wireless communication network 100 to beamform an uplink based on the antenna type and the aperture beamwidth of airborne transceiver 114. Airborne transceiver 114 wirelessly transfers its airborne transceiver ID to terrestrial transceiver 131 (401). Terrestrial transceiver 131 determines if airborne transceiver 114 can perform uplink aerial beamforming based on the airborne transceiver ID (402). For example, terrestrial transceiver 131 may enter a data structure with the airborne transceiver ID for airborne transceiver 114 to yield an aerial uplink beamforming qualification for airborne transceiver 114. If airborne transceiver 114 cannot perform uplink aerial beamforming (403), network 100 serves transceiver 114 without uplink aerial beamforming (404). If airborne transceiver 114 can perform uplink aerial beamforming (403), terrestrial transceiver 131 processes wireless signals from airborne transceiver 114 to determine the altitude and aerial uplink beamforming metrics for the antenna type and aperture beamwidth of airborne transceiver 114 (405). Terrestrial transceiver 131 processes the altitude and the aerial uplink beamforming metrics to generate an uplink beamforming instruction and an uplink power instruction (406). Terrestrial transceiver 131 wirelessly transfers the uplink beamforming instruction and the uplink power instruction to airborne transceiver 114 (407). Airborne transceiver 114 beamforms, amplifies, and transmits a wireless signal to terrestrial transceiver 131 responsive to the aerial uplink beamforming instruction and the uplink power instruction (408). The operation then repeats (405).

Figure 5:
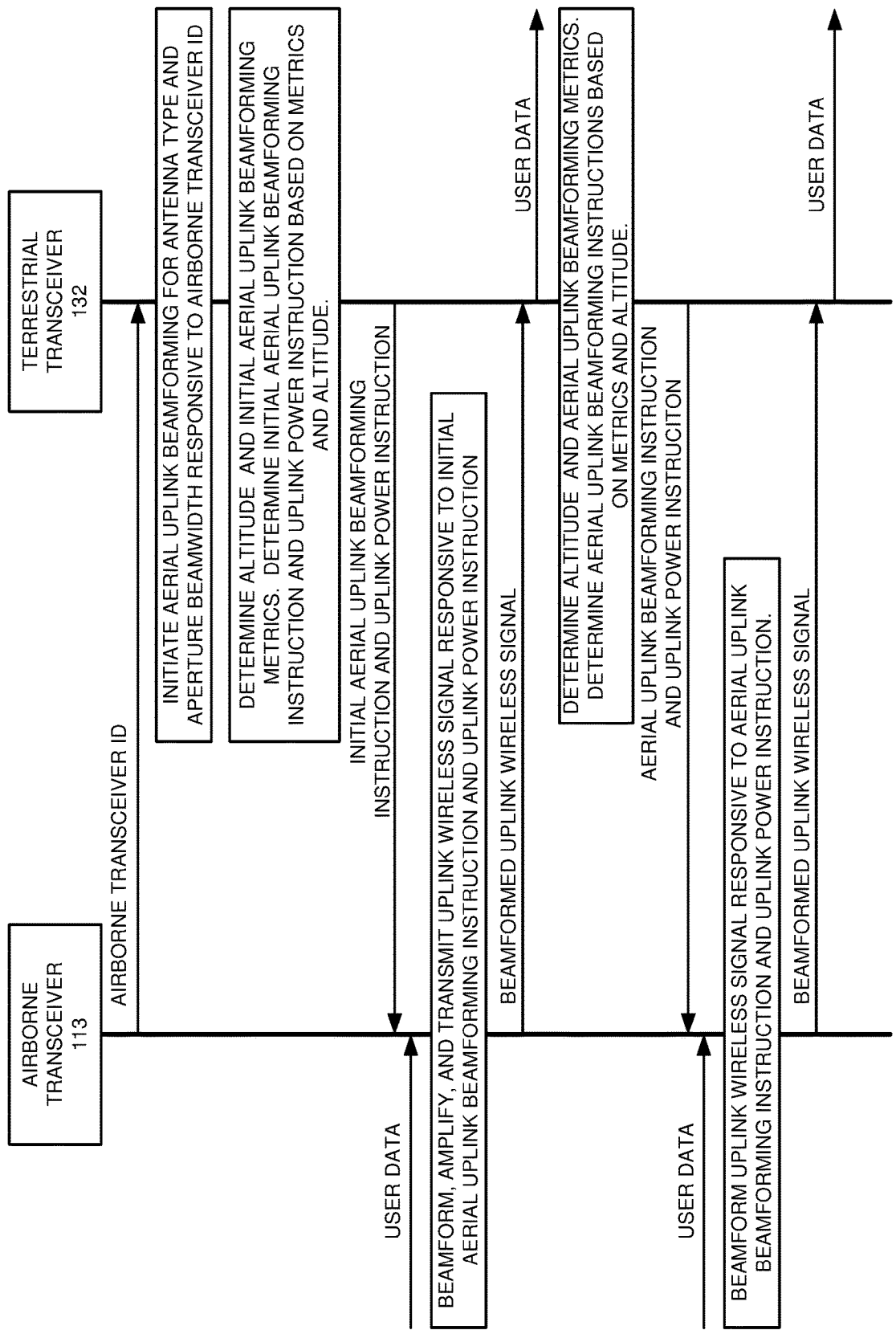
FIG. 5 illustrates the operation of the wireless communication network to beamform the uplink based on the antenna type and the aperture beamwidth of the airborne transceiver.

FIG. 5 illustrates the operation of wireless communication network 100 to beamform uplinks based on the antenna type and the aperture beamwidth of airborne transceiver 113. Airborne transceiver 113 wirelessly transfers its airborne transceiver ID to terrestrial transceiver 132. Based on the airborne transceiver ID from airborne transceiver 113, terrestrial transceiver 132 initiates aerial uplink beamforming for airborne transceiver 113. Terrestrial transceiver 132 processes wireless signals from airborne transceiver 113 to determine the altitude and initial aerial uplink beamforming metrics for airborne transceiver 113. Terrestrial transceiver 132 processes the altitude and the initial aerial uplink beamforming metrics to generate an uplink beamforming instruction and an uplink power instruction. Terrestrial transceiver 132 wirelessly transfers the uplink beamforming instruction and the uplink power instruction to airborne transceiver 113. Airborne transceiver 113 beamforms, amplifies, and transmits a wireless signals to terrestrial transceiver 132 responsive to the aerial uplink beamforming instruction and the uplink power instruction.

Advantageously, wireless communication network 100 effectively and efficiently beamforms uplinks from aerial transceivers 113-114 to terrestrial transceivers 131-132 to mitigate interference.

Figure 6:
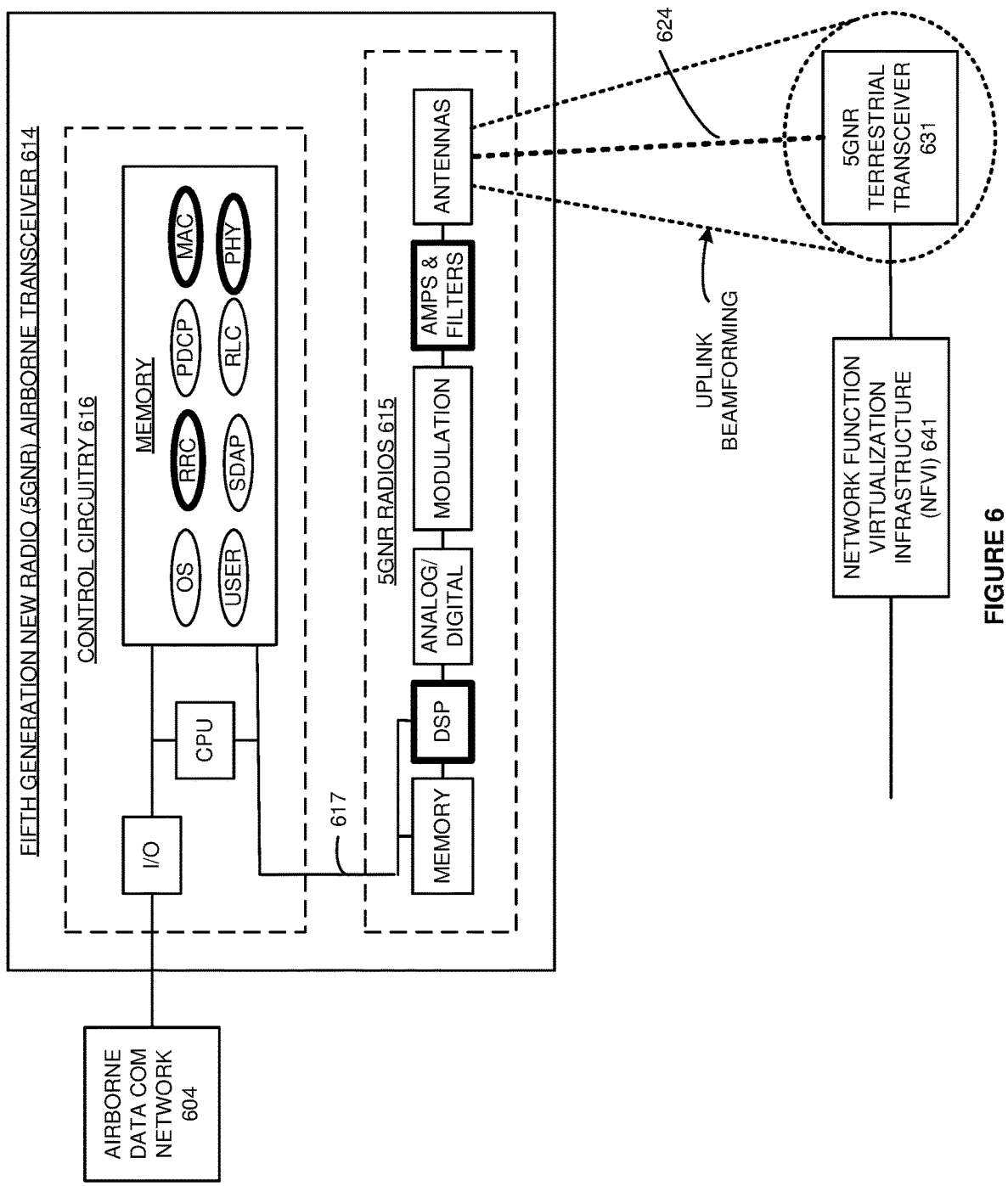
FIG. 6 illustrates a Fifth Generation New Radio (5GNR) airborne transceiver that beamforms uplinks based on its antenna type and an aperture beamwidth.

FIG. 6 illustrates Fifth Generation New Radio (5GNR) airborne transceiver 614 that beamforms uplinks based on its antenna type and aperture beamwidth. 5GNR airborne transceiver 614 is an example of airborne transceivers 113-114, although transceivers 113-114 may differ. 5GNR airborne transceiver 614 comprises 5GNR radios 615 and control circuitry 616 which are interconnected over bus circuitry 617. 5GNR radios 615 comprise antennas, amplifiers, filters, modulation, analog-to-digital interfaces, DSP, and memory that are coupled over bus circuitry. The antennas in 5GNR airborne transceiver 614 are wirelessly coupled to 5GNR terrestrial transceiver 631 over wireless 5GNR links 624. The antennas have an antenna type, and the antenna type has an aperture beamwidth.

Control circuitry 616 comprises data Input/Output circuitry (I/O), CPU, and memory. The memory in control circuitry 616 stores an operating system, user applications, and network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The CPU executes the operating system, user applications, and network applications to exchange user data with airborne data com network 604 over the data I/O. The CPU executes the operating system and network applications to wirelessly exchange corresponding signaling and data with 5GNR terrestrial transceiver over 5GNR radios 615.

In 5GNR radios 615, the antennas receive wireless 5GNR signals from 5GNR terrestrial transceiver 631 that transport Downlink (DL) 5GNR signaling and DL 5GNR data. The DL 5GNR signaling includes uplink beamforming instructions and uplink power instructions. The antennas transfer corresponding electrical DL signals through duplexers to the amplifiers. The amplifiers boost the received DL signals for filters which attenuate unwanted energy. Demodulators down-convert the DL signals from their carrier frequencies. The analog/digital interfaces convert the analog DL signals into digital DL signals for the DSPs. The DSPs recover DL 5GNR symbols from the DL digital signals. The CPU executes the network applications to process the DL 5GNR symbols and recover the DL 5GNR signaling and the 5GNR DL data. The RRC transfers the uplink beamforming instruction to the PHY and transfers the uplink power instruction to the MAC. The RRC transfers corresponding DL user signaling to the operating system/user applications. The SDAP interworks 5GNR data and user data and transfers corresponding DL user data to the operating system/user applications for delivery to airborne data com network 604.

The SDAP receives Uplink (UL) user data from the operating system/user applications which received the user data from airborne data com network 604. The SDAP interworks the 5GNR data and the user data. The RRC receives UL signaling from the operating system/user applications. The RRC processes the UL user signaling and the DL 5GNR signaling to generate new DL user signaling and new UL 5GNR signaling. The network applications process the UL 5GNR signaling and the UL 5GNR data to generate corresponding UL 5GNR symbols. In particular, the PHY applies the beamforming instructions when mapping, precoding, and the like. The MAC applies the power control instructions through the DSP and amplifiers.

In 5GNR radios 615, the DSP processes the UL 5GNR symbols to generate corresponding digital signals for the analog-to-digital interfaces. The DSP exerts power control over the amplifiers per the MAC. The analog-to-digital interfaces convert the digital UL signals into analog UL signals for modulation. Modulation up-converts the UL signals to their carrier frequencies. The amplifiers boost the modulated UL signals to the selected UL transmit power levels per the DSP uplink power control. The filters attenuate unwanted out-of-band energy and transfer the filtered UL signals through duplexers to the antennas. The electrical UL signals drive the antennas to emit corresponding wireless 5GNR signals that transport the UL 5GNR signaling and UL 5GNR data to 5GNR terrestrial transceiver 631.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/dematching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In 5GNR airborne transceiver 614, the RRC wirelessly transfers the Service Profile Identifier (SPID) for transceiver 614 to terrestrial transceiver 631 over 5GNR radios 615. In response, the RRC receives 5GNR signaling from 5GNR terrestrial transceiver 631 with uplink beamforming instructions and uplink power instructions for the antenna type and aperture beamwidth of airborne transceiver 614. The beamforming instructions may include RSSI, PMI, RI. The uplink power instructions indicate a power modification or the target uplink transmit power.

The RRC signals the PHY to beamform the uplink wireless signal using the RSSI, PMI, RI, and other the uplink beamforming information. The PHY applies mapping, coding, multiplexing, and the like to beamform the uplink signals. The RRC signals the power control to the MAC, and the MAC directs 5GNR radios 615 to amplify the uplink wireless signal to the selected transmit power. The amplifiers increase or decrease the uplink gain per the MAC control.

The PHY may determine is geometric position relative to the ground (and terrestrial transceiver 131) using gyro circuitry. The PHY may then alter the beamforming based on the geometric orientation. When airborne transceiver turns, the PHY senses the turn and adjusts the uplink beamforming to center the beam on 5GNR terrestrial transceiver 631 throughout the turn. The PHY may determine RSSI, PMI, and RI during downlink channel estimation. The RRC then transfers the downlink RSSI, PMI, and RI to terrestrial transceiver 631 for downlink beamforming. The PHY subsequently receives the beamformed downlink signal from terrestrial transceiver 631.

Figure 7:
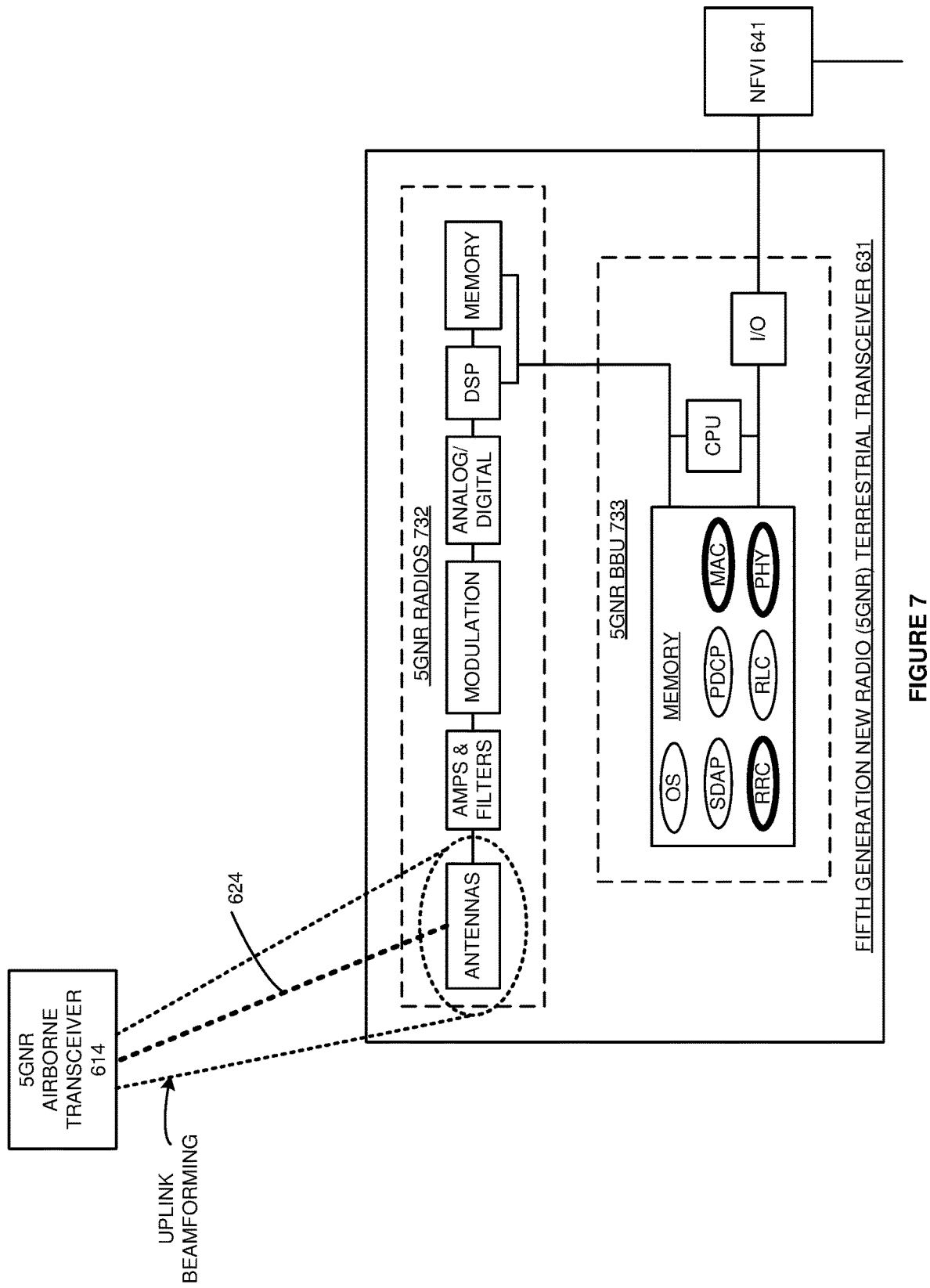
FIG. 7 illustrates a 5GNR terrestrial transceiver that beamforms uplinks based on the antenna type and the aperture beamwidth of the 5GNR airborne transceiver.

FIG. 7 illustrates 5GNR terrestrial transceiver 631 that beamforms the uplink based on the antenna type and the aperture beamwidth of 5GNR airborne transceiver 614. 5GNR terrestrial transceiver 631 is an example of terrestrial transceivers 131-132, although transceivers 131-132 may differ. 5GNR terrestrial transceiver 631 comprise 5GNR radios 732 and 5GNR Baseband Unit (BBU) 733. 5GNR radios 732 comprise antennas, amplifiers, filters, modulation, analog-to-digital interfaces, DSP, and memory that are coupled over bus circuitry. 5GNR BBU 733 comprises memory, CPU, and data Input/Output (I/O) that are coupled over bus circuitry.

5GNR airborne transceiver 614 is wirelessly coupled to the antennas in 5GNR radios 732. 5GNR radios 732 and 5GNR BBU 733 are coupled over data links like Common Public Radio Interface (CPRI) or some other network protocol. The data I/O in 5GNR BBU 733 is coupled over backhaul links to NFVI 641. In BBU 733, the memory stores an operating system, PHY, MAC, RLC, PDCP, SDAP, and RRC. The CPUs execute the PHY, MAC, RLC, PDCP, SDAP, and RRC to drive the exchange of data and signaling between 5GNR airborne transceiver 614 and NFVI 641 over 5GNR radios 732.

In 5GNR radios 732, the antennas receive wireless signals from 5GNR airborne transceiver 614 that transport UL 5GNR signaling and UL 5GNR data. The UL 5GNR signaling sometimes includes the SPID for 5GNR airborne transceiver 614. The antennas transfer corresponding electrical UL signals through duplexers to the amplifiers. The amplifiers boost the received UL signals for filters which attenuate unwanted energy. Modulators down-convert the UL signals from their carrier frequencies. The analog/digital interfaces convert the analog UL signals into digital UL signals for the DSP. The DSP recovers UL 5GNR/LTE symbols from the UL digital signals. In 5GNR BBU 733, the CPU executes the network applications to process the UL 5GNR symbols and recover UL 5GNR signaling and UL 5GNR data. The PHY detects the RSSI and RI for the uplink and determines the uplink PMI. The MAC determines the uplink power control.

In 5GNR BBU 733, the CPU executes the 5GNR RRC to process the UL 5GNR signaling and DL 5GNR signaling to generate new UL 5GNR signaling and new DL 5GNR signaling. The new UL 5GNR signaling sometimes has the SPID for airborne transceiver 614. The 5GNR RRC transfers the new UL 5GNR signaling to an Access and Mobility Management Function (AMF) in 641 over the data I/O and backhaul links. The 5GNR SDAP transfers the UL 5GNR data to a User Plane Function (UPF) in NFVI 641 over the data I/O and backhaul links. The 5GNR RRC receives the DL 5GNR signaling from the AMF that sometimes includes aerial uplink beamforming information. The 5GNR SDAP receives DL 5GNR data from the UPF.

The 5GNR network applications in 5GNR BBU 733 process the DL 5GNR signaling and DL 5GNR data to generate corresponding DL 5GNR symbols that represent the DL 5GNR signaling and DL 5GNR data in the frequency domain. In 5GNR radios 732, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-ofband energy. The filters transfer the filtered DL signals through duplexers to the antennas. The electrical DL signals drive the antennas to emit corresponding wireless signals that transport the DL 5GNR signaling and DL 5GNR data to 5GNR airborne transceiver 614.

RRC functions comprise authentication, security, handover control, status reporting, QoS, network broadcasts and pages, and network selection. PDCP functions comprise LTE/5GNR allocations, security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The RRC in 5GNR BBU 733 receives the SPID from airborne transceiver 614 over link 624 and 5GNR radios 732. The RRC in BBU 733 transfers the SPID for airborne transceiver 614 to the AMF in NFVI 641 to determine if airborne transceiver 614 qualifies for aerial uplink beamforming. The RRC receives signaling from the AMF indicating that airborne transceiver 614 qualifies for aerial uplink beamforming. The signaling from the AMF also has data for the antenna type and the aperture beamwidth of airborne transceiver 614. For example, the signaling may indicate a specific PHY and MAC that are configured for the specific antenna type and/or the aperture beamwidth of airborne transceiver 614. Terrestrial transceiver 631 wirelessly receives uplink wireless signals from airborne transceiver 614 over link 624. The PHY determines uplink beamforming metrics like matrix values for the uplink wireless signal during channel estimation. The PHY determines the altitude of airborne transceiver 614 based on the uplink beamforming metrics. For example, the PHY may process sounding reference signals from airborne transceiver 614 to determine received signal amplitude and phase from each transmitting antenna element to each receiving antenna element. The PHY may determine the altitude of airborne transceiver 614 based on signal loss, radio triangulation, airborne transceiver signaling, or some other technique. The PHY in BBU 733 processes the beamforming metrics and the altitude to generate an uplink beamforming instruction for the specific antenna type and aperture beamwidth of airborne transceiver 614. The uplink beamforming instruction may comprise an uplink Precoding Matrix Indicator (PMI), uplink Rank Index (RI), and uplink Received Signal Strength Indicator (RSSI).

The MAC in BBU 733 processes the RSSI and the altitude to generate an uplink power instruction for the specific antenna type and aperture beamwidth of airborne transceiver 614. The uplink power instruction typically comprises a decibel increase or decrease, but the instructions may indicate the desired transmit power, a percentage of the maximum transmit power, or some other power control data. The MAC may host a data structure for the specific antenna type and aperture beamwidth that translates the altitude and RSSI into target uplink transmit power. For lower altitudes like 100 feet, the MAC may select a lower uplink transmit power that relies on ground reflection to propagate enough signal power to terrestrial transceiver 631. The MAC and PHY in BBU 733 transfer the uplink beamforming and power instructions to 5GNR airborne receiver 614.

The PHY in BBU 733 may initiate aerial downlink beamforming for 5GNR airborne transceiver 614. For downlink beamforming, the PHY in BBU 733 receives downlink beamforming instructions like RSSI, PMI, and RI from 5GNR airborne receiver 614. The PHY beamforms the downlink wireless signals based on the PMI, RI, RSSI, and other downlink beamforming information.

Figure 8:
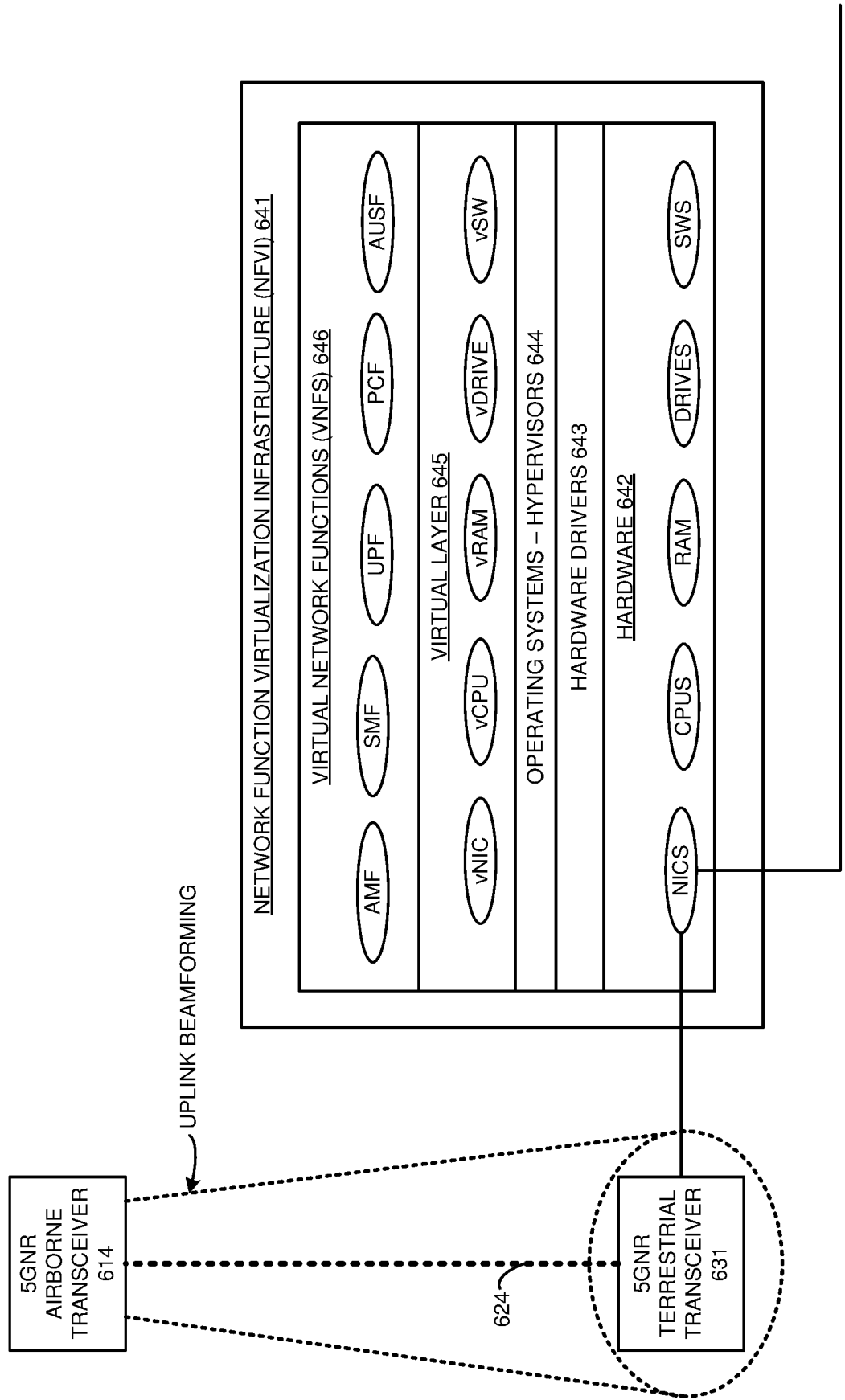
FIG. 8 illustrates a Network Function Virtualization Infrastructure (NFVI) that supports uplink beamforming based on the antenna type and the aperture beamwidth of the 5GNR airborne transceiver.

FIG. 8 illustrates Network Function Virtualization Infrastructure (NFVI) 641 that supports uplink beamforming based on the antenna type and the aperture beamwidth of 5GNR airborne transceiver 614. NFVI 641 is an example of network controller 141, although network controller 141 may differ. NFVI 641 comprises hardware 642, hardware drivers 643, operating systems and hypervisors 644, virtual layer 645, and Virtual Network Functions (VNFs) 646. Hardware 642 comprises Network Interface Cards (NICs), CPUs, RAM, flash/disk drives, and data switches (SWS). Virtual layer 643 comprises virtual NICs (vNIC), virtual CPUs (vCPU), virtual RAM (vRAM), virtual Drives (vDRIVE), and virtual Switches (vSW). The NICs in NFVI 641 are coupled to 5GNR terrestrial transceiver 631 over backhaul links. VNFs 646 comprise Access and Mobility Management Function (AMF), Authentication Server Function (AUSF), Session Management Function (SMF), User Plane Function (UPF), Policy Control Function (PCF), and the like. Hardware 642 executes hardware drivers 643, operating systems and hypervisors 644, virtual layer 645, and VNFs 646 to serve 5GNR airborne transceiver 614 with data services including authorizing the uplink aerial beamforming to 5GNR terrestrial transceiver 631.

5GNR terrestrial transceiver 631 transfers the SPID for 5GNR airborne transceiver 614 to the AMF. The AMF transfers the SPID to the AUSF. The AUSF translates the SPID into an instruction to use aerial uplink beamforming based on data specific to the antenna type and aperture beamwidth of airborne transceiver 614. The AUSF transfers the aerial uplink beamforming instruction to the AMF which signals the instruction to the RRC in 5GNR terrestrial transceiver 631.

Figure 9:
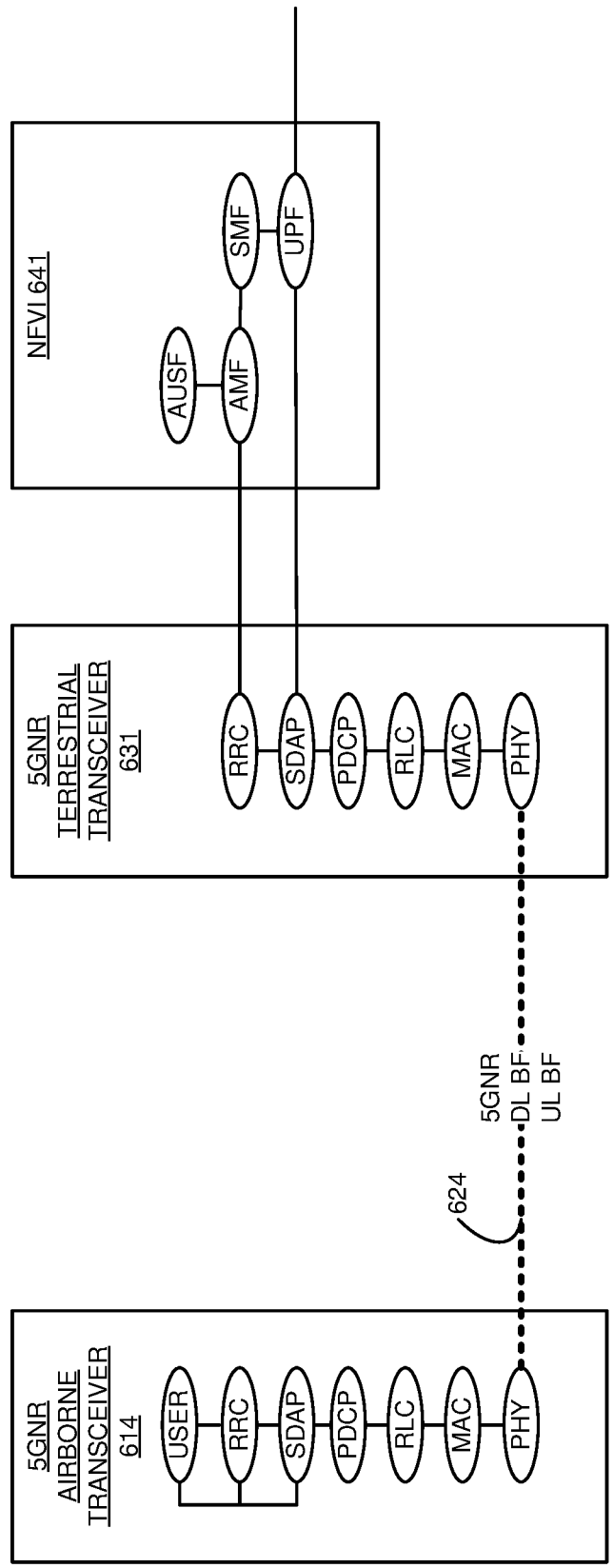
FIG. 9 illustrates the operation of the 5GNR airborne transceiver, 5GNR terrestrial transceiver, and NFVI to beamform uplinks based on the antenna type and the aperture beamwidth of the 5GNR airborne transceiver.

FIG. 9 illustrates the operation of 5GNR airborne transceiver 614, 5GNR terrestrial transceiver 631, and NFVI 641 to beamform uplinks based on the antenna type and the aperture beamwidth of 5GNR airborne transceiver 614. The RRC in 5GNR airborne transceiver 614 wirelessly transfers its Service Profile Identifier (SPID) to the RRC in terrestrial transceiver 631 over the RLCs, MACs, and PHYs.

The RRC in 5GNR terrestrial transceiver 631 receives the SPID from airborne transceiver 614 over the RLCs, MACs, and PHYs The RRC in 5GNR terrestrial transceiver 631 transfers the SPID for 5GNR airborne transceiver 614 to the AMF in NFVI 641 over an N2 link. The AMF transfers the SPID to the AUSF. The AUSF translates the SPID into an authorization to use aerial uplink beamforming based on data specific to the antenna type and aperture beamwidth of airborne transceiver 614. For example, the data may identify software modules and/or parameters to use when aerial uplink beamforming for airborne transceiver 614. The AUSF transfers the aerial uplink beamforming authorization to the AMF which signals the authorization to the RRC in 5GNR terrestrial transceiver 631.

In response to the aerial uplink beamforming authorization, the PHY in terrestrial transceiver 631 processes uplink signals to determine uplink beamforming metrics during channel estimation. The PHY determines the altitude of airborne transceiver 614 based on signal loss, radio triangulation, airborne transceiver signaling, or some other technique. The PHY processes the beamforming metrics and the altitude to generate an uplink beamforming instruction for the specific antenna type and aperture beamwidth of airborne transceiver 614. The uplink beamforming instruction may comprise an uplink PMI, uplink RI, uplink RSSI, and/or some other uplink control data.

The MAC in 5GNR terrestrial transceiver 631 processes the RSSI and the altitude to generate an uplink power instruction for the specific antenna type and aperture beamwidth of airborne transceiver 614. The MAC may host a data structure for the specific antenna type and aperture beamwidth that translates the altitude and RSSI into target uplink transmit power. For lower altitudes, the MAC may decrease the uplink transmit power to a level that uses ground reflection for signal power at terrestrial transceiver 631. The MAC and PHY in 5GNR terrestrial transceiver 631 transfer the uplink beamforming and power instructions to 5GNR airborne receiver 614.

The RRC in airborne transceiver 614 receives the uplink beamforming instructions and uplink power instructions from the RRC in 5GNR terrestrial transceiver. The RRC signals the PHY to beamform the uplink wireless signal using the RSSI, PMI, RI, and other the uplink beamforming information. The PHY applies mapping, coding, multiplexing, and the like to beamform the uplink signals per the uplink beamforming instructions. The RRC signals the power control to the MAC, and the MAC drives the amplifiers per the uplink power instructions. The amplifiers increase or decrease their uplink gain per the MAC control.

On the uplink, user data flows from the user applications in 5GNR airborne transceiver 614 through the SDAP, PDCP, RLC, and MAC to the PHY. The PHY beamforms the user data, and the MAC controls uplink power. The PHY transmits the beamformed user data to the PHY in 5GNR terrestrial transceiver 631.

In 5GNR terrestrial transceiver, the PHY determines uplink beamforming instructions, and the MAC determines uplink power instructions based on the received uplink data (and reference signals). The user data flows from the PHY to the SDAP over the MAC, RLC, and PDCP. The SDAP transfers the user data to the UPF. The AMF and SMF control the UPF to serve the uplink. The UPF forwards the user data to external systems to complete the uplink.

Figure 10:
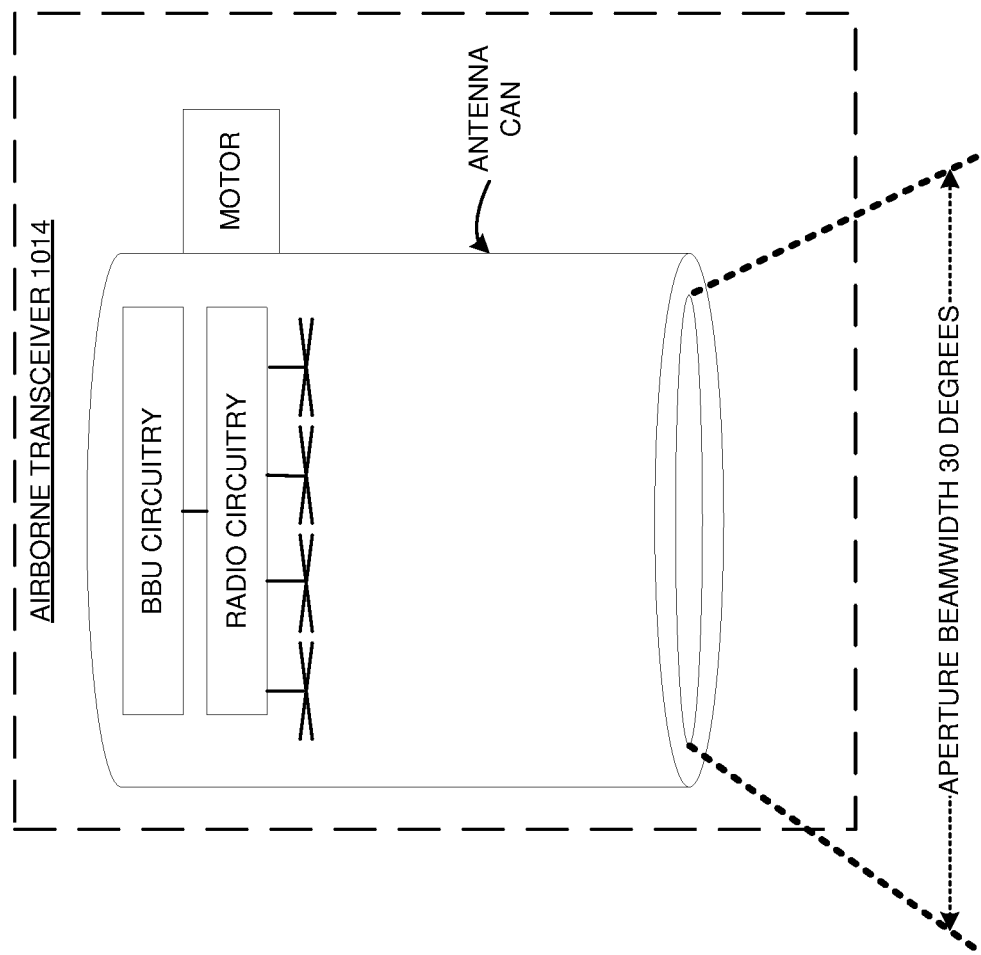
FIG. 10 illustrates an airborne transceiver that uses an antenna can to beamform uplinks to an aperture beamwidth.

FIG. 10 illustrates airborne transceiver 1014 that uses an antenna can to beamform uplinks to an aperture beamwidth. Airborne transceiver 1014 is an example of airborne transceivers 113-114 and 614, although transceivers 113-114 and 614 may differ. Airborne transceiver 1014 has BBU circuitry, radio circuitry, a motor, and an antenna can. The radio circuitry has antennas that are shown on FIG. 10 as cross-pole antennas, but other antennas could be used. The antenna can is a hollow metal cylinder with an open end that points straight down towards earth when airborne. A gyro or gimbal may be used to maintain the downward pointing angle. The antenna can is a wave guide that controls the aperture beamwidth. An exemplary aperture beamwidth for can antennas is around 30 degrees. The motor moves the antenna can up and down to change the distance from the antennas to the can aperture and correspondingly change the aperture beamwidth. The uplink beamforming instructions from the terrestrial transceiver may direct airborne transceiver 1014 to move the antenna can up or down to change the aperture beamwidth. The uplink beamforming instructions from the terrestrial transceiver may direct airborne transceiver 1014 to increase or decrease null signals that are emitted from some of the antenna elements to change the aperture beamwidth. The BBU circuitry controls the radio circuitry based on the uplink beamforming and power instructions.

Figure 11:
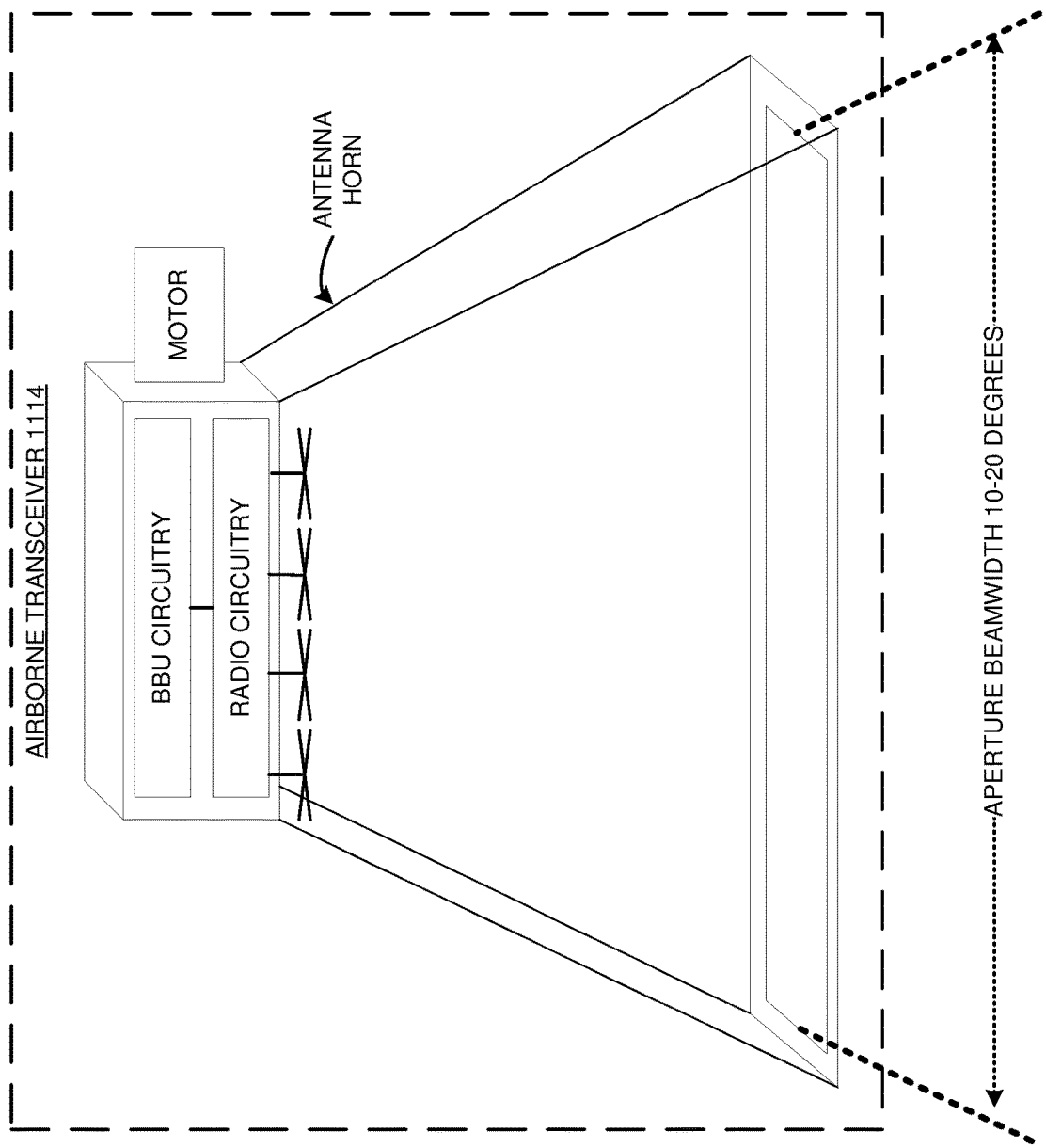
FIG. 11 illustrates an airborne transceiver that uses an antenna horn to beamform uplinks to an aperture beamwidth.

FIG. 11 illustrates airborne transceiver 1114 that uses an antenna horn to beamform uplinks to an aperture beamwidth. Airborne transceiver 1114 is an example of airborne transceivers 113-114 and 614, although transceivers 113-114 and 614 may differ. Airborne transceiver 1114 has BBU circuitry, radio circuitry, a motor, and an antenna horn. The radio circuitry has antennas that are shown on FIG. 10 as cross-pole antennas, but other antennas could be used. The antenna horn is a metal box that is wider at the bottom and that points straight down towards earth when airborne. A gyro or gimbal may be used to maintain the downward pointing angle. The antenna horn is a wave guide that controls the aperture beamwidth. An exemplary aperture beamwidth for a horn antenna is between 10 and 20 degrees. The motor moves the antenna horn up and down to change the distance from the antennas to the horn aperture and correspondingly change the aperture beamwidth. The uplink beamforming instructions from the terrestrial transceiver may direct airborne transceiver 1114 to move the antenna horn up or down to change the aperture beamwidth. The uplink beamforming instructions from the terrestrial transceiver may direct airborne transceiver 1114 to increase or decrease null signals that are emitted from some of the antenna elements to change the aperture beamwidth. The BBU circuitry controls the radio circuitry based on the uplink beamforming and power instructions.

Figure 12:
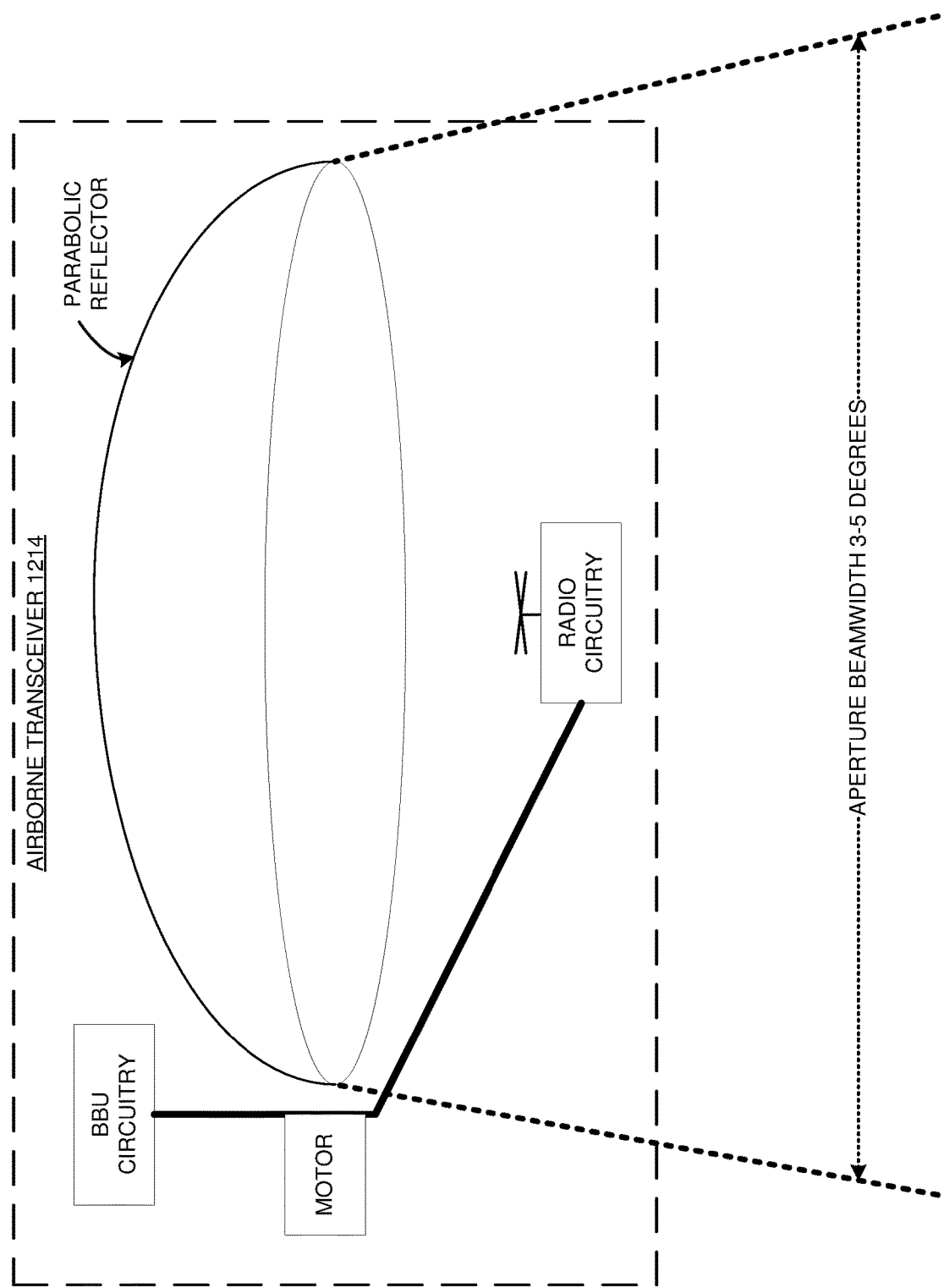
FIG. 12 illustrates an airborne transceiver that uses a parabolic reflector to beamform uplinks to an aperture beamwidth.

FIG. 12 illustrates airborne transceiver 1214 that uses a parabolic reflector to beamform uplinks to an aperture beamwidth. Airborne transceiver 1214 is an example of airborne transceivers 113-114 and 614, although transceivers 113-114 and 614 may differ. Airborne transceiver 1214 has BBU circuitry, radio circuitry, a motor, and a parabolic reflector. The radio circuitry has an antenna that is shown on FIG. 10 as a cross-pole antenna, but other antennas could be used. The parabolic reflector is a metal dish having a relatively flat parabola shape that points straight down towards earth when airborne. A gyro or gimbal may be used to maintain the downward pointing angle. The parabolic reflector is a wave guide that controls the aperture beamwidth. An exemplary aperture beamwidth for a parabolic antenna is between three and five degrees. The motor moves the antennas up and down to change the distance from the antennas to the parabolic reflector and correspondingly change the aperture beamwidth. The uplink beamforming instructions from the terrestrial transceiver may direct airborne transceiver 1214 to move the antennas up or down to change the aperture beamwidth. The uplink beamforming instructions from the terrestrial transceiver may direct airborne transceiver 1214 to increase or decrease null signals that are emitted from some of the antenna elements to change the aperture beamwidth. The BBU circuitry controls the radio circuitry based on the uplink beamforming and power instructions.

The wireless data network circuitry described above comprises computer hardware and software that form special-purpose network circuitry to beamform uplinks based on the antenna types and aperture beamwidths of airborne transceivers. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to beamform uplinks based on the antenna types and aperture beamwidths of airborne transceivers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating terrestrial transceiver to beamform an uplink signal from an airborne transceiver, the method comprising:
   a radio wirelessly receiving an airborne transceiver Identifier (ID) and reference signals from the airborne transceiver and transferring the airborne transceiver ID and the reference signals to a Baseband Unit (BBU);
   the BBU receiving the airborne transceiver ID and the reference signals from the radio, determining a ground reflection gain at an altitude of the airborne transceiver based on the reference signals, determining a beamforming instruction based on the airborne transceiver ID, the reference signals, and the ground refection gain at the altitude of the airborne transceiver, and transferring the beamforming instruction to the radio;
   the radio receiving the beamforming instruction from the BBU and wirelessly transferring the beamforming instruction to the airborne transceiver, wherein the airborne transceiver beamforms the uplink signal based on the beamforming instruction;
   the radio wirelessly receiving the beamformed uplink signal from the airborne transceiver and transferring the beamformed uplink signal to the BBU; and
   the BBU receiving the beamformed uplink signal from the radio.

2. The method of claim 1 wherein the BBU determining the ground reflection gain at the altitude of the airborne transceiver based on the reference signals comprises determining the altitude of the airborne transceiver based on one or more of signal loss, radio triangulation, or airborne transceiver signaling.

3. The method of claim 1 wherein the BBU determining the beamforming instruction based on the airborne transceiver ID and the reference signals comprises determining a number of antennas in the airborne transceiver based on the airborne transceiver ID and determining the beamforming instruction based in part on the number of antennas of the airborne transceiver.

4. The method of claim 1 wherein the BBU determining the beamforming instruction based on the airborne transceiver ID and the reference signals comprises determining an antenna type for the airborne transceiver based on the airborne transceiver ID and determining the beamforming instruction based in part on the antenna type for the airborne transceiver.

5. The method of claim 1 wherein the BBU determining the beamforming instruction based on the airborne transceiver ID and the reference signals comprises determining an aperture beamwidth for the airborne transceiver based on the airborne transceiver ID and determining the beamforming instruction based in part on the aperture beamwidth for the airborne transceiver.

6. The method of claim 1 further comprising:
   the BBU determining a power instruction based on the airborne transceiver ID and the reference signals and transferring the power instruction to the radio; and
   the radio receiving the power instruction from the BBU and wirelessly transferring the power instruction to the airborne transceiver, wherein the airborne transceiver amplifies the uplink signal based on the power instruction.

7. The method of claim 6 wherein the BBU determining the power instruction based on the airborne transceiver ID and the reference signals comprises determining the power instruction based in part on the ground reflection gain at the altitude of the airborne transceiver.

8. The method of claim 6 wherein the BBU determining the power instruction based on the airborne transceiver ID and the reference signals comprises determining a number of antennas in the airborne transceiver based on the airborne transceiver ID and determining the power instruction based in part on the number of antennas of the airborne transceiver.

9. The method of claim 6 wherein the BBU determining the power instruction based on the airborne transceiver ID and the reference signals comprises determining an antenna type for the airborne transceiver based on the airborne transceiver ID and determining the power instruction based in part on the antenna type for the airborne transceiver.

10. The method of claim 6 wherein the BBU determining the power instruction based on the airborne transceiver ID and the reference signals comprises determining an aperture beamwidth for the airborne transceiver based on the airborne transceiver ID and determining the power instruction based in part on the aperture beamwidth for the airborne transceiver.

11. A terrestrial transceiver to beamform an uplink signal from an airborne transceiver, the terrestrial transceiver comprising:
    a radio configured to wirelessly receive an airborne transceiver Identifier (ID) and reference signals from the airborne transceiver and transfer the airborne transceiver ID and the reference signals to a Baseband Unit (BBU);

the BBU configured to receive the airborne transceiver ID and the reference signals from the radio, determine a ground reflection gain at an altitude of the airborne transceiver based on the reference signals, determine a beamforming instruction based on the airborne transceiver ID, the reference signals, and the ground reflection gain at the altitude of the airborne transceiver, and transfer the beamforming instruction to the radio;

the radio configured to receive the beamforming instruction from the BBU and wirelessly transfer the beamforming instruction to the airborne transceiver, wherein the airborne transceiver is configured to beamform the uplink signal based on the beamforming instruction;

the radio configured to wirelessly receive the beamformed uplink signal from the airborne transceiver and transfer the beamformed uplink signal to the BBU; and the BBU configured to receive the beamformed uplink signal from the radio.

12. The terrestrial transceiver of claim 11 wherein the BBU is configured to determine the altitude of the airborne transceiver based on one or more of signal loss, radio triangulation, or airborne transceiver signaling to determine the ground reflection gain at the altitude of the airborne transceiver based on the reference signals.

13. The terrestrial transceiver of claim 11 wherein the BBU is configured to determine a number of antennas in the airborne transceiver based on the airborne transceiver ID and determine the beamforming instruction based in part on the number of antennas of the airborne transceiver to determine the beamforming instruction based on the airborne transceiver ID and the reference signals.

14. The terrestrial transceiver of claim 11 wherein the BBU is configured to determine an antenna type for the airborne transceiver based on the airborne transceiver ID and determine the beamforming instruction based in part on the antenna type for the airborne transceiver to determine the beamforming instruction based on the airborne transceiver ID and the reference signals.

15. The terrestrial transceiver of claim 11 wherein the BBU is configured to determine an aperture beamwidth for the airborne transceiver based on the airborne transceiver ID and determine the beamforming instruction based in part on the aperture beamwidth for the airborne transceiver to determine the beamforming instruction based on the airborne transceiver ID and the reference signals.

16. The terrestrial transceiver of claim 11 further comprising:

the BBU configured to determine a power instruction based on the airborne transceiver ID and the reference signals and transfer the power instruction to the radio; and the radio configured to receive the power instruction from the BBU and wirelessly transfer the power instruction to the airborne transceiver, wherein the airborne transceiver is configured to amplify the uplink signal based on the power instruction.

17. The terrestrial transceiver of claim 16 wherein the BBU is configured to determine the power instruction based in part on the ground reflection gain at the altitude of the airborne transceiver to determine the power instruction based on the airborne transceiver ID and the reference signals.

18. The terrestrial transceiver of claim 16 wherein the BBU is configured to determine a number of antennas in the airborne transceiver based on the airborne transceiver ID and determine the power instruction based in part on the number of antennas of the airborne transceiver to determine the power instruction based on the airborne transceiver ID and the reference signals.

19. The terrestrial transceiver of claim 16 wherein the BBU is configured to comprises determine an antenna type for the airborne transceiver based on the airborne transceiver ID and determine the power instruction based in part on the antenna type for the airborne transceiver to determine the power instruction based on the airborne transceiver ID and the reference signals.

20. The terrestrial transceiver of claim 16 wherein the BBU is configured to determine an aperture beamwidth for the airborne transceiver based on the airborne transceiver ID and determine the power instruction based in part on the aperture beamwidth for the airborne transceiver to determine the power instruction based on the airborne transceiver ID and the reference signals.

\* \* \* \* \*